United States Patent
Park et al.

(10) Patent No.: US 12,548,427 B2
(45) Date of Patent: Feb. 10, 2026

(54) WIRELESS EARPHONE CASE WITH ANTI-LOSS FUNCTION FOR SMARTPHONE

(71) Applicants: MJ Biochem Co., Ltd., Seoul (KR); Sungmin Park, Seoul (KR)

(72) Inventors: Joonwon Park, Seoul (KR); Sungmin Park, Seoul (KR)

(73) Assignee: MJ Biochem Co., Ltd., Seoul (KR)

( * ) Notice: Subject to any disclaimer, the term of this patent is extended or adjusted under 35 U.S.C. 154(b) by 326 days.

(21) Appl. No.: 18/335,054

(22) Filed: Jun. 14, 2023

(65) Prior Publication Data
US 2024/0312334 A1    Sep. 19, 2024

(30) Foreign Application Priority Data
Mar. 16, 2023  (KR) .................. 10-2023-0034423

(51) Int. Cl.
*G08B 21/24* (2006.01)
*H04M 1/72412* (2021.01)
*H04R 1/10* (2006.01)
*H04R 1/1025* (2026.01)

(52) U.S. Cl.
CPC ........ *G08B 21/24* (2013.01); *H04M 1/72412* (2021.01); *H04R 1/1025* (2013.01); *H04R 1/1041* (2013.01); *H04R 2420/07* (2013.01)

(58) Field of Classification Search
CPC . G08B 21/24; H04M 1/72412; H04R 1/1025; H04R 1/1041; H04R 2420/07; H04R 1/10
USPC .......................................................... 455/557
See application file for complete search history.

(56) References Cited

U.S. PATENT DOCUMENTS

| | | | | |
|---|---|---|---|---|
| 10,176,698 | B1* | 1/2019 | Buschmann | G08B 21/0277 |
| 2023/0083358 | A1* | 3/2023 | Weizmann | G06F 3/165 |
| | | | | 381/313 |
| 2024/0046773 | A1* | 2/2024 | Saikawa | G08B 21/24 |
| 2024/0107217 | A1* | 3/2024 | Hollabaugh | H02J 7/007188 |

* cited by examiner

*Primary Examiner* — Eugene Yun
(74) *Attorney, Agent, or Firm* — Knobbe, Martens, Olson & Bear, LLP

(57) ABSTRACT

Wireless earphone case having a short-range wireless communication function comprising Bluetooth, and anti-loss function for smartphone is disclosed, wherein the wireless earphone case is paired with a smartphone and exchanges signals with each other, and when the distance between the two is greater than a predetermined interval, the smartphone is notified of the risk of loss by an alarm sound or vibration. The present disclosure has the effect of increasing the utilization of users by dramatically increasing the economy and convenience of users compared to the existing disclosure by simply utilizing a wireless earphone case without any additional devices other than a smartphone and a wireless earphone, and a smartphone user can obtain anti-loss function for smartphone without the inconvenience of purchasing or carrying a separate device other than a smartphone and a wireless earphone.

11 Claims, 4 Drawing Sheets

WIRELESS EARPHONE CASE WITH ANTI-LOSS FUNCTION FOR SMARTPHONE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

TECHNICAL FIELD

The present disclosure relates to a wireless earphone case with anti-loss function for a smartphone, and more particularly to a wireless earphone case with anti-loss function for a smartphone, in which a wireless earphone case equipped with a short-range wireless communication function including Bluetooth is paired with a smartphone to exchange signals with each other, and when the distance between the two becomes larger than a predetermined interval, the smartphone is notified of the risk of loss by an alarm sound or vibration.

BACKGROUND

In the modern world, smartphones have become a necessity rather than an option. In addition, many expensive smartphones are being released as their functions are diversified and their utilization is increasing. As more and more people are using smartphones, the number of lost smartphones is also increasing.

The loss of a smartphone can cause great damage that is difficult to quantify monetarily due to the loss of various personal and business information stored on the smartphone.

In this situation, it is necessary to develop technology to reduce the risk of smartphone loss. Various methods can be proposed, but the important thing is that smartphone users can reduce the risk of smartphone loss without spending much effort or money.

Korean Patent Registration No. 1334271 and 1462500 disclose the related technology. The disclosure of this section is to provide background information relating to the present disclosure. Applicant does not admit that any information contained in this section constitutes prior art.

SUMMARY

The present disclosure is basically aimed at preventing the loss of smartphones by allowing smartphone users to easily utilize the smartphone loss prevention function while minimizing additional devices and efforts. As a solution, by adding a short-range wireless communication function with a smartphone to a wireless earphone case of a smartphone, an alarm signal can be generated by a smartphone when the wireless earphone is out of a predetermined distance even when not in use, and a wireless earphone case that can be controlled by a smartphone app is provided.

The present disclosure provides a wireless earphone case with anti-loss function for smartphone, said case comprising: a wired or wireless power connection unit; a wireless earphone charging unit for charging the wireless earphone through said power connection unit:
    a battery unit charging through said power connection unit; a short-range wireless communication module unit having a short-range wireless communication module and receiving pairing information from a smartphone loss alarm app through short-range wireless communication with a smartphone installed with the smartphone loss alarm app provided to be installed on the smart phone and performing pairing setting; a distance information providing unit activated to provide information to calculate a distance separated from said smartphone through said pairing setting; and a battery power control unit for distributing battery power to a first mode used to charge the wireless earphone when not connected to the power connection unit or to a second mode used to drive the short-range communication module unit and the distance information providing unit, wherein said smartphone loss alarm app causes the smartphone to generate an alarm when the distance between the smartphone and the paired case is greater than a predetermined value, and to set a power distribution reference value of the battery power control unit.

In the foregoing wireless earphone case, wherein said short-range wireless communication is Bluetooth or ZigBee, wherein said alarm generated by said smartphone is at least one selected from the group consisting of an alarm sound, a vibration, and an alarm light.

In the foregoing wireless earphone case, wherein said smartphone loss alarm app calculates the separated distance using information provided by the distance information providing unit, wherein said information provided by said distance information providing unit is a detection signal sent to said smartphone via said short-range wireless communication module at predetermined intervals, wherein said smartphone loss alarm app calculates the separated distance by multiplying the speed of said sensing signal by the arrival time.

In the foregoing wireless earphone case, wherein said power distribution reference value of battery power control unit causes power to be distributed only to said second mode when a remaining power level of the battery is less than predetermined value, wherein said predetermined value is set by a user with said app.

In the foregoing wireless earphone case, wherein the predetermined value of the remaining power level of the battery is 40% of the full charge of the battery.

In the foregoing wireless earphone case, wherein said app determines that the distance between said smartphone and said paired case is greater than a predetermined value when the time for which information provided by said distance information providing unit cannot be received after pairing exceeds a predetermined time.

In the foregoing wireless earphone case, wherein said predetermined time is set by a user in said app, wherein a default value of the predetermined time is 5 seconds.

The wireless earphone case of this disclosure has the effect of increasing user utilization by enabling smartphone users to simply utilize a wireless earphone case without the need for additional devices other than a smartphone and a wireless earphone, thereby achieving high economic efficiency and dramatically increasing user convenience compared to existing disclosures. Smartphone users can obtain an anti-loss function for smartphone without the inconvenience of purchasing or carrying a separate device other than a smartphone and a wireless earphone.

The present disclosure provides a method for preventing loss of a smartphone using a wireless earphone case with anti-loss function for smartphone, said method comprising: installing a smartphone loss alarm app on a smartphone; receiving smartphone pairing information from said smartphone loss alarm app via short-range communication with said smartphone, and making a pairing setting with a short-range communication module of a wireless earphone case; and, through said pairing setting, activating a distance information providing portion of the wireless earphone case that provides information to calculate a distance separating said smartphone and said wireless earphone case, said loss alarm app causing said smartphone to generate an alarm when the distance between said smartphone and said paired case is greater than a predetermined value, said wireless earphone case comprising a wired and wireless power connection unit, an earphone charging unit, a battery unit, a short-range communication module unit, a distance information providing unit, and a battery power control unit, wherein said battery power control unit, when not connected to said power connection, distributes battery power to a first mode used to charge said earphones or a second mode used to drive said short-range communication module unit and said distance information providing unit.

In the foregoing method for preventing loss of a smartphone using a wireless earphone case, wherein said short-range communication is Bluetooth or Zigbee, said smartphone alarm is at least one selected from the group consisting of an alarm sound, a vibration, and an alarm light, said app calculates the separated distance using information provided by the distance information providing unit, said information provided by said distance information providing unit is a detection signal sent to said smartphone via said short-range communication module at predetermined intervals, and said smartphone loss alarm app calculates the separated distance by multiplying the speed of said sensing signal by the arrival time.

In the foregoing method for preventing loss of a smartphone using a wireless earphone case, wherein a power distribution reference value of said battery power control unit causes power to be distributed only to said second mode when the power level of said battery is less than a predetermined value, wherein said predetermined value is set by a user with said app.

In the foregoing method for preventing loss of a smartphone using a wireless earphone case, wherein said app determines that the distance between said smartphone and said paired case is greater than a predetermined value when the time for which information provided by said information providing unit cannot be received after pairing exceeds a predetermined time.

DETAILED DESCRIPTION OF EMBODIMENTS

Figure 1:
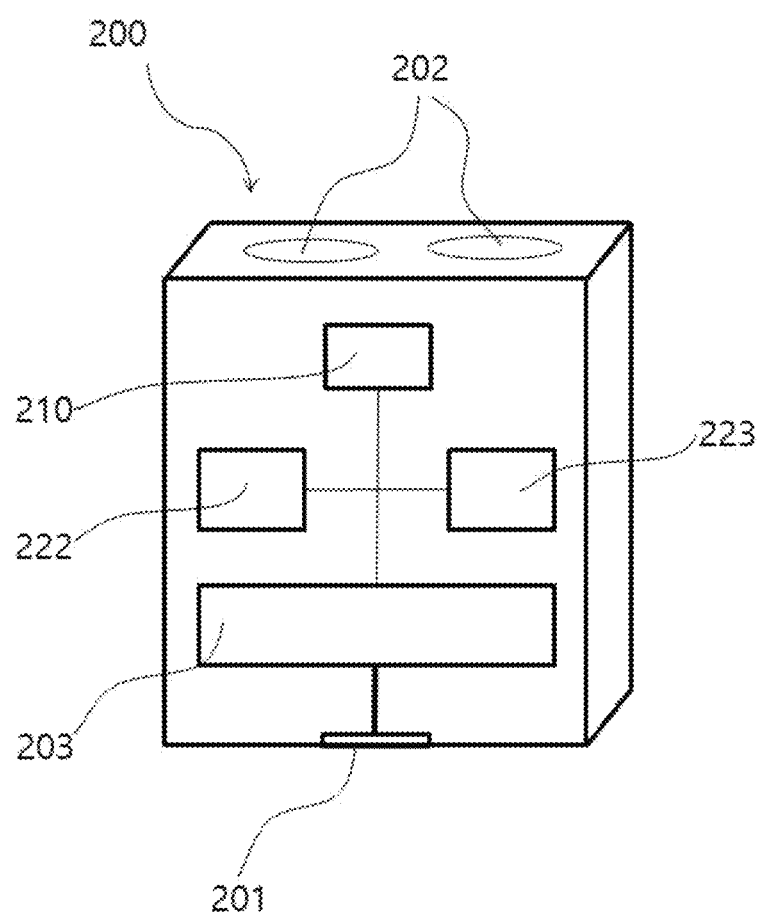
FIG. 1 is a conceptual diagram of a wireless earphone case comprising a short-range wireless communication module unit, a distance information providing unit, and a battery power control unit, according to one embodiment of the present disclosure.

Various aspects are disclosed with reference to the drawings. In the following description, for purposes of illustration, several specific details are disclosed to provide a general understanding of one or more aspects. However, it will be recognized that these aspects may be practiced without each specific detail. The following description and accompanying drawings detail certain example aspects of one or more aspects. However, these aspects are examples and some of the various methods may be utilized in the principles of the various aspects, and the description is intended to include all such aspects and equivalents thereof.

Various aspects and features will be presented by systems that may include multiple devices, modules, and the like. It is also to be understood and recognized that various systems may include additional devices, parts, components, etc. and/or may not include all of the devices, parts, components, etc. discussed in connection with the drawings.

Further, the term "or" is intended to mean an implied "or" rather than an exclusive "or," i.e., if not otherwise specified or clear from the context, "X utilizes A or B" is intended to mean one of the natural implied substitutions, i.e., if X utilizes A; if X utilizes B; or if X utilizes both A and B, "X utilizes A or B" may apply in any of the above cases. In addition, the term "and/or" as used herein shall be understood to refer to and include all possible combinations of one or more of the enumerated relevant items.

Further, the terms "comprises" and/or "comprising" should be understood to mean that the feature, step, operation, module, and/or component is present, but not to preclude the presence or addition of one or more other features, steps, operations, modules, components, and/or groups thereof. Further, while terms such as first and second may be used herein to describe various components, such components are not limited by such terms, i.e., such terms are used only to distinguish between two or more components and should not be construed to imply order or priority. In addition, unless otherwise specified or unless it is clear from the context that the singular form is intended, the singular in this specification and claims should be construed to mean "one or more" generally. The disclosure will now be described in detail with reference to the following drawings.

The core configuration of the present disclosure is that the wireless earphone case is connected to a smartphone via a short-range wireless communication such as Bluetooth even when the wireless earphone is not in use, and if the wireless earphone case moves away from the smartphone by more than a certain distance, the smartphone provides an alarm signal such as a warning tone to notify the smartphone user.

Many smartphone users are using wireless earphones in conjunction with their smartphones. In addition, smartphones and wireless earphones are already equipped with short-range wireless communication functions and power management. When a smartphone user is using a wireless earphone and the distance between the smartphone and the wireless earphone falls beyond a certain distance, the short-range wireless communication is naturally disconnected and the user realizes that the smartphone has moved away from the user.

However, when the wireless earphones are not in use, there is no way for the smartphone user to recognize that the distance between the wireless earphones and the smartphone has increased. Therefore, the inventors developed a smartphone loss prevention technology using smartphones and a wireless earphone system by utilizing this situation.

FIG. 1 is a conceptual diagram of a wireless earphone case or earbud charger case 200 comprising a short-range wireless communication module unit or short-range wireless communication circuit 210, a distance information providing unit 222, and a battery power control unit or battery power controller 223, according to one embodiment of the present disclosure. The present disclosure is a wireless earphone case with anti-loss function for smartphone, said case comprising: a wired or wireless power connection unit or power connector 201; a wireless earphone charging unit or wireless earphone charger 202 for charging the wireless earphone through said power connection unit; a battery unit 203 charging through said power connection unit; a short-range wireless communication module unit 210 having a short-range wireless communication module and receiving pairing information from a smartphone loss alarm app through short-range wireless communication with a smartphone installed with the smartphone loss alarm app provided to be installed on the smart phone and performing pairing setting; a distance information providing unit or distance information provider circuit 222 activated to provide information to calculate a distance separated from said smartphone through said pairing setting; and a battery power control unit or battery power controller 223 for distributing battery power to a first mode used to charge the wireless earphone when not connected to the power connection unit or to a second mode used to drive the short-range communication module unit and the distance information providing unit. In one embodiment of the present disclosure, wherein said wired or wireless power connection unit of the wireless earphone case can simultaneously charge the battery of the wireless earphone and the wireless earphone when the wireless earphone is mounted on the wireless earphone case and connected to a power source.

In embodiments, the case 200 may include the components, units or modules discussed above and additional components, units or modules. In one embodiments, all or at least a portion of the components, units or modules of the case 200 may be implemented by hardware, e.g., electric circuits. In another embodiment, all or at least a portion of the components, units or modules of the case 200 may be implemented by one or more processors and a memory of the case 200 and one or more instructions stored in the memory configured to implement the functions of the components, units or modules of the case 200 when executed by the one or more processors.

Figure 2:
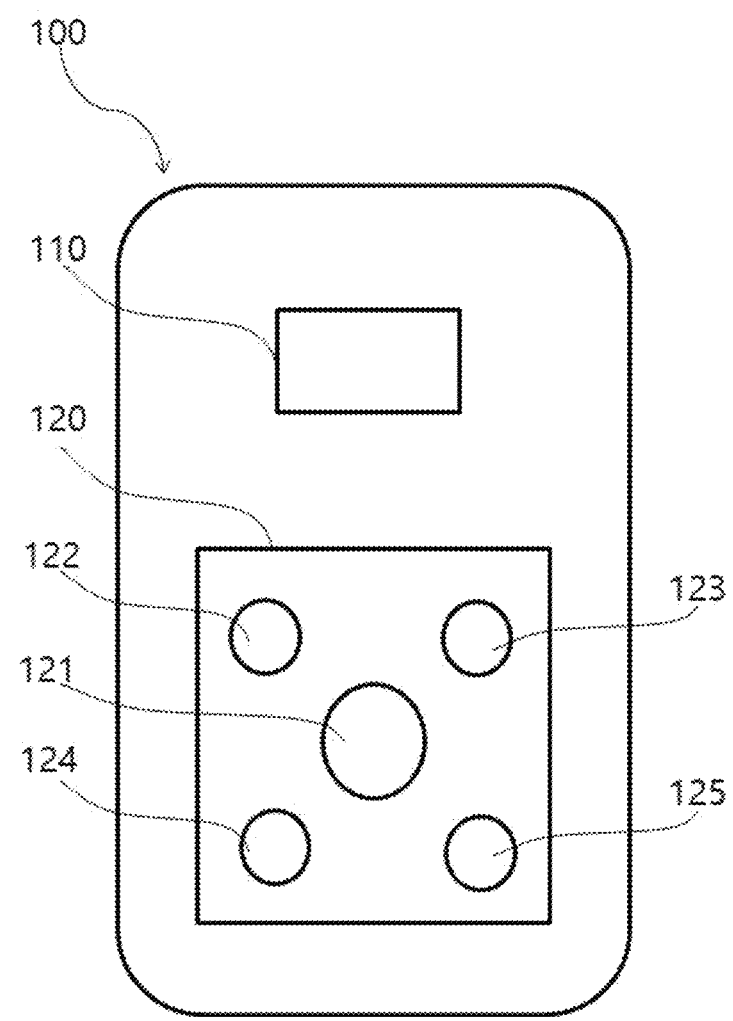
FIG. 2 is a conceptual diagram of a smartphone comprising a short-range wireless communication module unit and a smartphone loss alarm app, according to one embodiment of the present disclosure.

FIG. 2 is a conceptual diagram of a smartphone 100 comprising a short-range wireless communication module unit or short-range wireless communication circuit 110 and a smartphone loss alarm application (or app) 120, according to one embodiment of the present disclosure. In one embodiment of the present disclosure, wherein said smartphone loss alarm app causes the smartphone to generate an alarm when the distance between the smartphone and the paired case is greater than a predetermined value, and to set a power distribution reference value of the battery power control unit, and may set a power distribution reference value for the battery power control unit. In one embodiment of the disclosure, when said smartphone is in an alarm situation, said app's alarm module 125 causes said smartphone to generate an alarm via at least one of a light, a display, a vibrator or a speaker, wherein said smartphone alarm is at least one selected from the group consisting of an alarm sound, a vibration, and an alarm light.

In one embodiment of the disclosure, said smartphone loss alarm app calculates the separated distance using information provided by the distance information providing unit, said the wired/wireless power connection unit of the wireless earphone case can simultaneously charge the battery of the wireless earphone and the wireless earphone when the wireless earphone is mounted on the wireless earphone case and connected to a power source. Information provided by said distance information providing unit is a detection signal sent to said smartphone via said short-range wireless communication module at predetermined intervals, and said smartphone loss alarm app calculates the separated distance by multiplying the speed of said sensing signal by the arrival time. Specifically, the wireless earphone case distance calculation module 122 of the loss alarm app installed on said smartphone 100 calculates the distance using information obtained from the distance information providing unit 222 of said wireless earphone case 200, and the detection signal of said smartphone is periodically measured at a predetermined interval by the wireless earphone case signal reception interval measurement module 124. In one embodiment of the present disclosure, an alarm can be generated when said calculated distance exceeds a predetermined value, and in one embodiment, a distance can be set to 10 meters, or greater or lesser. The setting of said distance can be executed in the app settings and control module 121 of the loss alarm app 120. In one embodiment of the disclosure, said app may determine that the distance between said smartphone and said paired case is greater than a predetermined value when the time for which information provided by said distance information providing unit cannot be received after pairing exceeds a predetermined time. In one embodiment of the present disclosure, said predetermined time is set by the user in the app, but the default value of said predetermined time may be set to 5 seconds or 3 seconds or 7 seconds or 10 seconds or more. Setting the default value of the time may be executable in the app settings and control module 121 of the loss alarm app 120.

In one embodiment of the present disclosure, said power distribution reference value of battery power control unit causes power to be distributed only to said second mode when a remaining power level of the battery is less than predetermined value, and said predetermined value is set by a user with said app. Specifically, the state of the battery 203 of said wireless earphone case and the control of the battery power control unit 223 accordingly is controlled by the power distribution module 123 of the wireless earphone case battery power control unit of said loss alarm app. The predetermined value of the remaining power level of the battery is, in embodiments, 40% of the full charge of the battery, but may be greater or lesser. The setting of said predetermined value can be executed in the app settings and control module 121 of said loss alarm app 120.

In embodiments, the smartphone 100 may include the components, units or modules discussed above and additional components, units or modules. In one embodiments, all or at least a portion of the components, units or modules of the smartphone 100 may be implemented by hardware, e.g., electric circuits. In another embodiment, all or at least a portion of the components, units or modules of the smartphone 100 may be implemented by one or more processors and a memory of the smartphone 100 and one or more instructions stored in the memory configured to implement the functions of the components, units or modules of the smartphone 100 when executed by the one or more processors.

Figure 3:
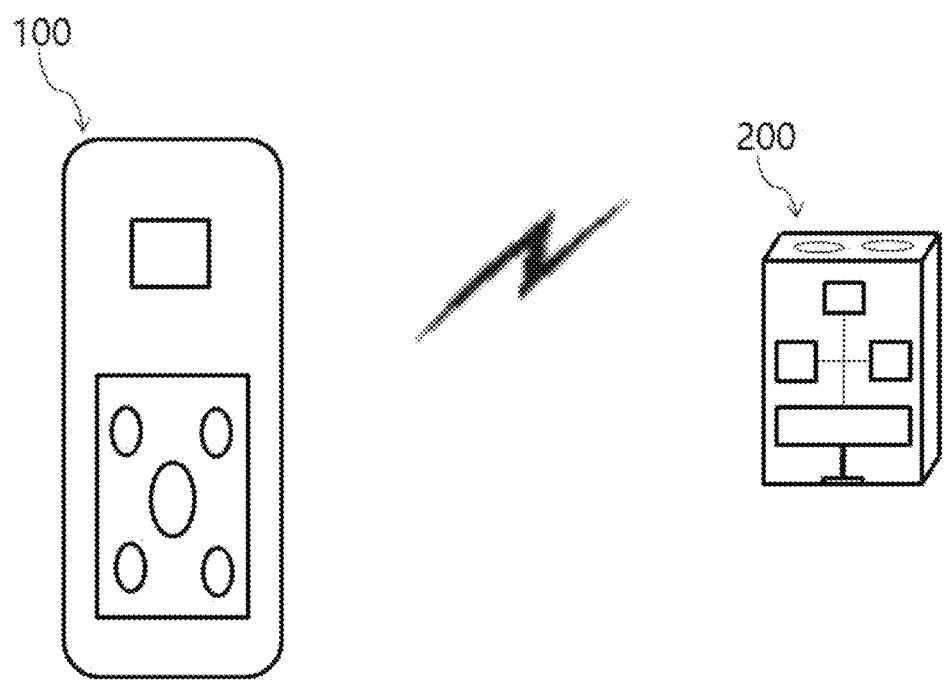
FIG. 3 is a conceptual diagram of a smartphone and a wireless earphone case paired and communicating via short-range wireless communication, according to one embodiment of the present disclosure.

FIG. 3 is a conceptual diagram of a smartphone and a wireless earphone case paired and communicating via short-range wireless communication, according to one embodiment of the present disclosure. In one embodiment of the disclosure, said short-range wireless communication may be selected as Bluetooth or ZigBee, but any that can provide distance information between said smartphone and said wireless earphone case may be adopted. Pairing setting of the smartphone and the wireless earphone case through the app, collection of detection signal interval information transmitted and received while the smartphone is paired with the wireless earphone case, collection of information from the distance information providing unit of the wireless earphone case and collection of battery information from the battery power control unit of the wireless earphone case are performed between the smart phone and the wireless earphone case through the short-range communication. In addition, information on a predetermined distance value executed by the app setting and control module, a predetermined time interval from a time when information cannot be received, and a predetermined value of the remaining power level of the battery are also exchanged through the short-range communication.

In embodiments, the communication module 210 of the case 200 may establish a connection with the communication module 110 of the smartphone 100 only when the wireless earphone is retained or accommodated in the case 200. In embodiments, the communication module 210 of the case 200 may be disconnected from the communication module 110 of the smartphone 100 when the wireless earphone is connected to the smartphone 100.

In one embodiment, the connection between the communication modules 210 and 110 is released when the wireless earphone is pulled out of a nest portion of the case 100. The disconnection can be initiated and processed by the communication module 210 of the case 110. When the wireless earphone is re-positioned in the nest portion of the case 200, the connection between the communication modules 210 and 110 is re-established.

In another embodiment, the connection between the communication modules 210 and 110 is released when a connection between the earphone and the smartphone is established. The disconnection may be initiated and processed by the communication module 110 of the smartphone 100, e.g., by the app 120. When the wireless earphone is disconnected from the smartphone, the connection between the communication modules 210 and 110 is re-established.

Figure 4:
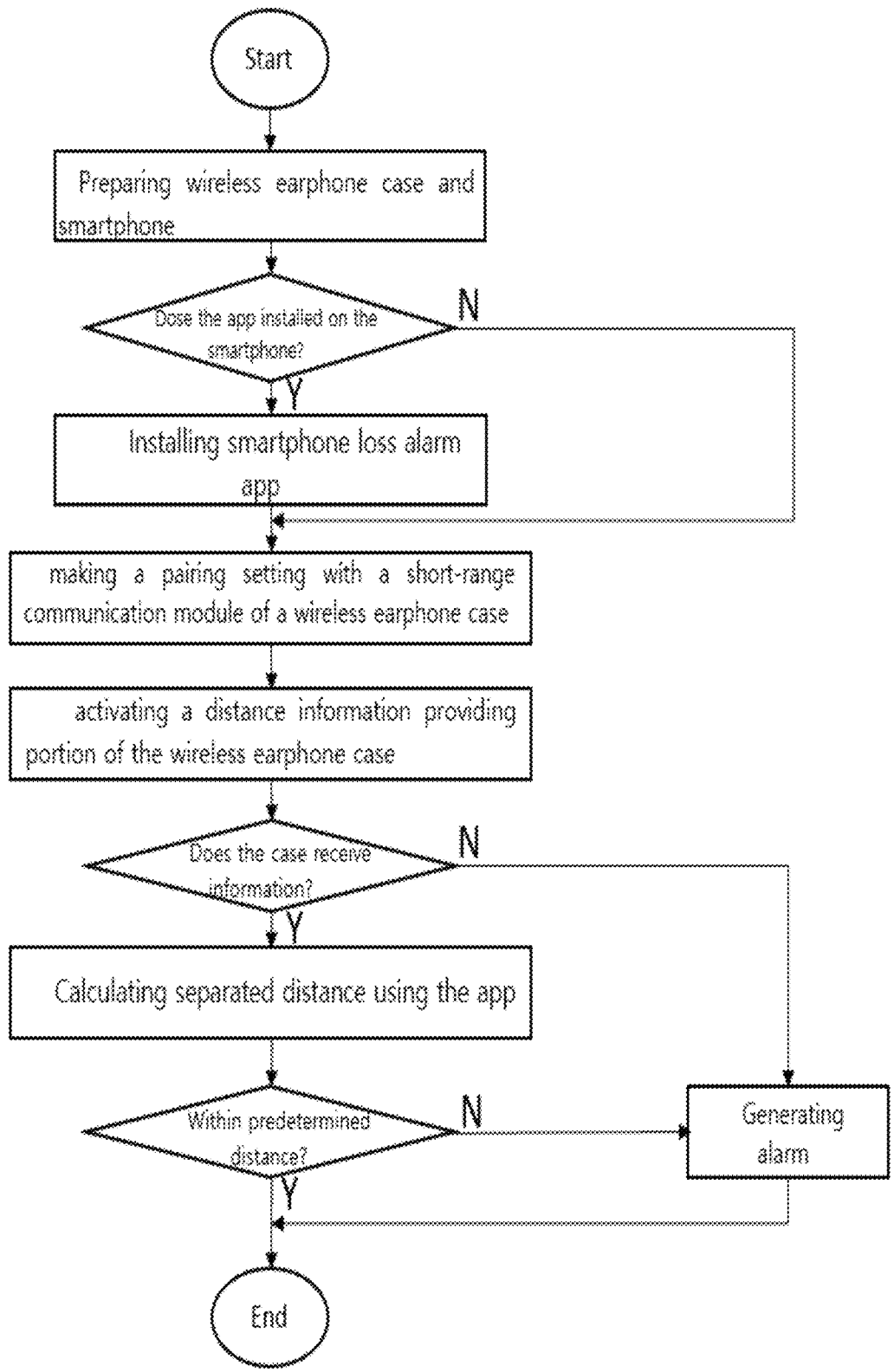
FIG. 4 illustrates a method for preventing the loss of smartphone using pairing a smartphone and a wireless earphone case via short-range wireless communication, according to one embodiment of the present disclosure.

FIG. 4 illustrates a method for preventing the loss of smartphone using pairing a smartphone and a wireless earphone case via short-range wireless communication, according to one embodiment of the present disclosure. The method comprises: installing a smartphone loss alarm app on a smartphone; receiving smartphone pairing information from said smartphone loss alarm app via short-range communication with said smartphone, and making a pairing setting with a short-range communication module of a wireless earphone case; and, through said pairing setting, activating a distance information providing portion of the wireless earphone case that provides information to calculate a distance separating said smartphone and said wireless earphone case.

In embodiments, the loss alarm app causing said smartphone to generate an alarm when the distance between said smartphone and said paired case is greater than a predetermined value, wherein said wireless earphone case comprising a wired and wireless power connection unit, an earphone charging unit, a battery unit, a short-range communication module unit, a distance information providing unit, and a battery power control unit, wherein said battery power control unit, when nor connected to said power connection, distributes battery power to a first mode used to charge said earphones or a second mode used to drive said short-range communication module unit and said distance information providing unit. In one embodiment of the disclosure, wherein said short-range communication is Bluetooth or Zigbee, said smartphone alarm is at least one selected from the group consisting of an alarm sound, a vibration and an alarm light, said app calculates the separated distance using information provided by said information providing unit, said information provided by said distance information providing unit is a detection signal sent to said smartphone via said short-range communication module at predetermined intervals, and said smartphone loss alarm app calculates the separated distance by multiplying the speed of said sensing signal by the arrival time.

In one embodiment of the disclosure, wherein a power distribution reference value of said battery power control unit causes power to be distributed only to said second mode when the power level of said battery is less than a predetermined value, wherein said predetermined value is set by a user with said app. In one embodiment of the disclosure, wherein said app determines that the distance between said smartphone and said paired case is greater than a predetermined value when the time for which information provided by said information providing unit cannot be received after pairing exceeds a predetermined time.

Logical blocks, modules or units described in connection with embodiments of smartphones and earphone cases disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

The description of the presented embodiments is provided to enable one of ordinary skill in the art of the present disclosure to use or practice the present disclosure. Various modifications to these embodiments will be apparent to one of ordinary skill in the art, and the general principles defined herein may be applied to other embodiments without departing from the scope of the disclosure. Accordingly, the disclosure is not to be limited to the embodiments set forth herein, but is to be construed in the broadest sense consistent with the principles and novel features set forth herein.

What is claimed is:

1. A wireless earphone case with anti-loss function for smartphone, said case comprising:
    a wired or wireless power connection unit;
    a wireless earphone charging unit for charging the wireless earphone through said power connection unit;
    a battery unit charging through said power connection unit;
    a short-range wireless communication module unit having a short-range wireless communication module and receiving pairing information from a smartphone loss alarm app through short-range wireless communication with a smartphone installed with the smartphone loss alarm app provided to be installed on the smart phone and performing pairing setting;
    a distance information providing unit activated to provide information to calculate a distance separated from said smartphone through said pairing setting; and
    a battery power control unit for distributing battery power to a first mode used to charge the wireless earphone when not connected to the power connection unit or to a second mode used to drive the short-range communication module unit and the distance information providing unit, wherein said smartphone loss alarm app causes the smartphone to generate an alarm when the distance between the smartphone and the paired case is greater than a predetermined value, and to set a power distribution reference value of the battery power control unit.

2. The wireless earphone case of claim 1,
wherein said short-range wireless communication is Bluetooth or ZigBee,
wherein said alarm generated by said smartphone is at least one selected from the group consisting of an alarm sound, a vibration, and an alarm light.

3. The wireless earphone case of claim 1,
Wherein said smartphone loss alarm app calculates the separated distance using information provided by the distance information providing unit,
wherein said information provided by said distance information providing unit is a detection signal sent to said smartphone via said short-range wireless communication module at predetermined intervals,
wherein said smartphone loss alarm app calculates the separated distance by multiplying the speed of said sensing signal by the arrival time.

4. The wireless earphone case of claim 1,
wherein said power distribution reference value of battery power control unit causes power to be distributed only to said second mode when a remaining power level of the battery is less than predetermined value,
wherein said predetermined value is set by a user with said app.

5. The wireless earphone case of claim 4,
wherein the predetermined value of the remaining power level of the battery is 40% of the full charge of the battery.

6. The wireless earphone case of claim 1,
wherein said app determines that the distance between said smartphone and said paired case is greater than a predetermined value when the time for which information provided by said distance information providing unit cannot be received after pairing exceeds a predetermined time.

7. The wireless earphone case of claim 6,
wherein said predetermined time is set by a user in said app,
wherein a default value of the predetermined time is 5 seconds.

8. A method for preventing the loss of a smartphone using a wireless earphone case with anti-loss function for smartphone, said method comprising:
installing a smartphone loss alarm app on a smartphone;
receiving smartphone pairing information from said smartphone loss alarm app via short-range communication with said smartphone, and making a pairing setting with a short-range communication module of a wireless earphone case; and
through said pairing setting, activating a distance information providing portion of the wireless earphone case that provides information to calculate a distance separating said smartphone and said wireless earphone case,
wherein said loss alarm app causing said smartphone to generate an alarm when the distance between said smartphone and said paired case is greater than a predetermined value,
wherein said wireless earphone case comprising a wired and wireless power connection unit, an earphone charging unit, a battery unit, a short-range communication module unit, a distance information providing unit, and a battery power control unit,
wherein said battery power control unit, when not connected to said power connection, distributes battery power to a first mode used to charge said earphones or a second mode used to drive said short-range communication module unit and said distance information providing unit.

9. The method for preventing the loss of a smartphone of claim 8,
wherein said short-range communication is Bluetooth or Zigbee,
wherein said smartphone alarm is at least one selected from the group consisting of an alarm sound, a vibration, and an alarm light,
wherein said app calculates the separated distance using information provided by the distance information providing unit,
wherein said information provided by said distance information providing unit is a detection signal sent to said smartphone via said short-range communication module at predetermined intervals, and said smartphone loss alarm app calculates the separated distance by multiplying the speed of said sensing signal by the arrival time.

10. The method for preventing the loss of a smartphone of claim 8,
Wherein a power distribution reference value of said battery power control unit causes power to be distributed only to said second mode when the power level of said battery is less than a predetermined value,
wherein said predetermined value is set by a user with said app.

11. The method for preventing the loss of a smartphone of claim 8,
wherein said app determines that the distance between said smartphone and said paired case is greater than a predetermined value when the time for which information provided by said information providing unit cannot be received after pairing exceeds a predetermined time.

* * * * *